United States Patent
Dilsen et al.

(10) Patent No.: US 8,833,855 B2
(45) Date of Patent: Sep. 16, 2014

(54) VEHICLE SEAT HAVING A MOVABLE BACKREST PART

(75) Inventors: Michael Dilsen, Wassenberg (DE); Jens Heinrich, Solingen (DE); Thomas Leneis, Reithofen (DE)

(73) Assignee: Johnson Controls Technology Company, Holland, MI (US)

( * ) Notice: Subject to any disclaimer, the term of this patent is extended or adjusted under 35 U.S.C. 154(b) by 133 days.

(21) Appl. No.: 13/521,420

(22) PCT Filed: Jan. 14, 2011

(86) PCT No.: PCT/EP2011/050478
§ 371 (c)(1),
(2), (4) Date: Sep. 21, 2012

(87) PCT Pub. No.: WO2011/086165
PCT Pub. Date: Jul. 21, 2011

(65) Prior Publication Data
US 2013/0001996 A1   Jan. 3, 2013

(30) Foreign Application Priority Data
Jan. 14, 2010 (DE) .......................... 10 2010 004 742

(51) Int. Cl.
*B60N 2/20* (2006.01)
*B60N 2/30* (2006.01)
*B60N 2/36* (2006.01)

(52) U.S. Cl.
CPC ............... *B60N 2/3009* (2013.01); *B60N 2/36* (2013.01); *B60N 2205/35* (2013.01)
USPC .......................... 297/291; 297/285; 297/378.1

(58) Field of Classification Search
USPC ........................ 297/285, 291, 299, 113, 301.3
See application file for complete search history.

(56) References Cited

U.S. PATENT DOCUMENTS 3,361,474 A     1/1968 Kolle
5,588,703 A *  12/1996 Itou ............................ 297/284.4
(Continued)

FOREIGN PATENT DOCUMENTS

CM    2887658 Y    4/2007
CN    1488531 A    4/2004
(Continued)

OTHER PUBLICATIONS

International Search Report for application No. PCT/EP2011/050478 mailed Mar. 21, 2011.
(Continued)

*Primary Examiner* — David R Dunn
*Assistant Examiner* — Jody Giacoman
(74) *Attorney, Agent, or Firm* — Fletcher Yoder, P.C.

(57) ABSTRACT

The present invention relates to a vehicle seat having a seat part and having at least one backrest part which is pivotable about an axis of rotation relative to the seat part, and having a spring means which is effective between the seat part and the backrest part, wherein the backrest part comprises at least a backrest rear wall, backrest upholstery and a backrest cover. According to the invention, a spring means designed as a torsion spring is in each case arranged completely within the corresponding backrest part, is supported at the first end thereof on the backrest rear wall and acts at the second end thereof opposite the first end on an intermediate piece or on a stop of the intermediate piece, wherein the intermediate piece is arranged on the axis of rotation and is fastened to a bearing in a manner fixed relative to the frame.

10 Claims, 2 Drawing Sheets

(56) References Cited

U.S. PATENT DOCUMENTS

Figure 1:
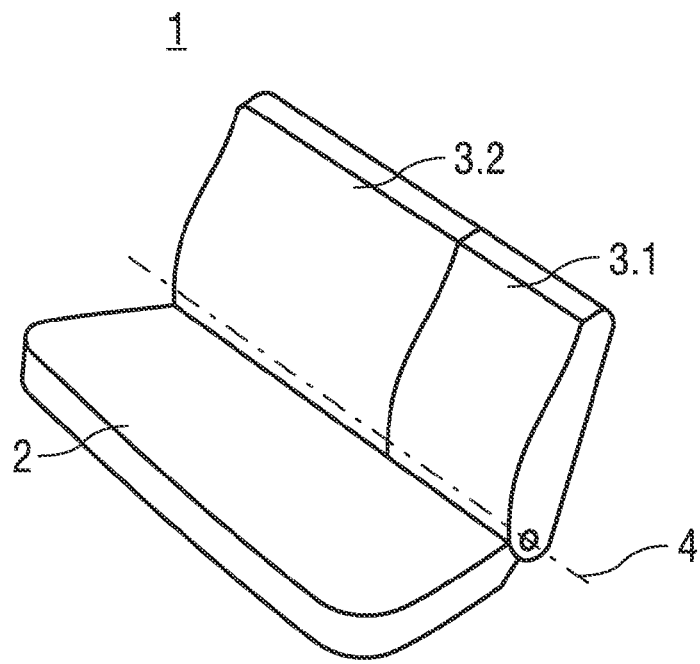

| | | | |
|---|---|---|---|
| 5,979,980 A * | 11/1999 | Amorin et al. | 297/218.4 |
| 8,360,522 B2 * | 1/2013 | Akutsu | 297/284.4 |
| 2001/0052722 A1 | 12/2001 | Amorin et al. | |
| 2008/0315654 A1 | 12/2008 | Boudinot et al. | |

FOREIGN PATENT DOCUMENTS

| | | |
|---|---|---|
| DE | 1914154 A1 | 6/1971 |
| DE | 102004062944 A1 | 5/2006 |
| DE | 102006004531 B3 | 8/2007 |
| DE | 102006030516 | 1/2008 |
| DE | 102006051270 B3 | 5/2008 |
| EP | 1747936 A2 | 1/2007 |
| GB | 1168790 A | 10/1969 |
| JP | S53-113527 | 2/1952 |
| JP | 4-115941 U | 10/1992 |
| JP | 1992-115941 | 10/1992 |
| JP | 1992-118053 | 10/1992 |
| JP | 10-157500 A | 6/1998 |
| JP | 2002-028042 | 1/2002 |
| WO | 2007028672 A1 | 7/2007 |

OTHER PUBLICATIONS

Chinese Office Action dated Jan. 6, 2014.
Japanese Office Action dated Nov. 18, 2013.

* cited by examiner

VEHICLE SEAT HAVING A MOVABLE BACKREST PART

CROSS REFERENCE TO RELATED APPLICATIONS

This application claims priority from and the benefit of PCT Application No. PCT/EP2011/050478, filed on Jan. 14, 2011 and German Patent DE 10 2010 004 742.2, filed on Jan. 14, 2010; both entitled "Vehicle Seat Having a Movable Backrest Part", which are herein incorporated by reference.

BACKGROUND

The present invention relates to a vehicle seat, in particular a motor vehicle seat, having an adjustable backrest, according to the preamble of claim 1.

Vehicle seats of the type in question are known from the prior art. For example, the backrests of the first row of seats are unlocked and folded forward in order to facilitate access for the passengers to the seats arranged therebehind. Furthermore, it is known to fold over a rear seat backrest towards the seat part in order thereby to obtain an enlarged loading space. The rear seat backrest is frequently also designed with a division of, for example, ⅔ to ⅓ in order to achieve greater variability in the use of the loading space. In order to initiate and to assist the folding-forward movement of the backrest directly after the unlocking thereof, an energy accumulator, for example a spring means, is frequently located on the backrest structure, said energy accumulator being supported at a first end on the backrest structure and at a second end on the seat part structure or the vehicle body. If, for example, for visual reasons or because the existing construction space does not permit otherwise the spring means is not located visibly within the backrest structure, i.e. between the backrest shell and the padding, the spring means has to be guided out of the padding and the seat cover during connection of the seat to a bearing fastened to the bodywork, which in general detracts from the appearance of the vehicle seat.

DE 10 2006 051 270 describes a vehicle seat, in particular motor vehicle seat, with two backrests which are coupled to a structure by means of in each case one outer swivel bearing and at least one central swivel bearing, as a result of which a backrest pivot axis is defined, and the backrests are each pivotable relative to the structure from a use position into a non-use position, and a joint spring on the central swivel bearing prestresses the two back rests toward the non-use position, wherein the spring acts with one leg section in each case on one of the two backrests and is supported by a central section in a manner fixed relative to the structure.

SUMMARY

The invention is based on the object of indicating an improved, in particular more reliably and easily operable vehicle seat.

The object is achieved according to the invention with a vehicle seat which has the features indicated in claim 1.

Advantageous refinements of the invention are the subject matter of the dependent claims.

In the case of the vehicle seat having a seat part and having at least one backrest part which is pivotable relative to the seat part about an axis of rotation, and having a spring means which is effective between the seat part and the backrest part, wherein the backrest part comprises at least a backrest rear wall, backrest upholstery and a backrest cover, according to the invention a spring means designed as a torsion spring is in each case arranged completely within the corresponding backrest part, is supported at the first end thereof on the backrest rear wall and acts at the second end thereof opposite the first end on an intermediate piece or on a stop of the intermediate piece, wherein the intermediate piece is arranged on the axis of rotation and is fastened to a bearing in a manner fixed relative to the frame. The spring means is therefore completely covered by the backrest upholstery and/or the backrest cover, thus reducing a risk of injury for the vehicle user. Particularly advantageously, a visual appearance of the vehicle seat is improved.

In one embodiment, the spring means is fastened rotatably to the backrest rear wall by means of at least one bearing point. As a result, the spring means is held on the backrest rear wall in an operationally reliable manner and can be subject to torsional stress as specified.

In a further embodiment, a first end of the spring means acts on the backrest part by means of the first bearing part which is arranged on the backrest rear wall in a manner fixed relative to the frame. A movement of the backrest part can therefore be assisted by the dynamic effect of the spring means, or a position of the backrest part can be held by the dynamic effect of the spring means.

Those sides of the spring means which face away from the backrest rear wall are advantageously covered by the backrest upholstery and/or the backrest cover. The spring means is therefore arranged concealed in the backrest rear wall and cannot be perceived visually and haptically by the vehicle user.

In a particularly advantageous manner, the intermediate piece is at least partially arranged within the backrest part, wherein at least a first flange of the intermediate piece with the stops arranged thereon is arranged within the backrest part. This permits, for the spring means, stops which are fixed in a manner relative to the frame and are arranged within the backrest part and are therefore concealed.

In an advantageous embodiment, a second flange of the intermediate piece is arranged substantially parallel to the first flange and is spaced apart therefrom by means of a connecting part. A torsionally stiff connection is therefore produced between the first and the second flange.

In a further advantageous embodiment, a plurality of tabs are arranged on the second flange of the intermediate piece, the tabs engaging in a form-fitting manner around edges of the bearing. This permits the intermediate piece to be coupled to the bearing in a manner fixed relative to the frame and in particular in a manner secure against rotation, the bearing being arranged on a vehicle body in a manner fixed relative to the frame.

In a particularly advantageous embodiment, the intermediate piece is coupled to the bearing by means of an axially arranged connecting means. As a result, the intermediate piece is securely held on the bearing in the axial direction.

In a use position of the backrest part, a first stop of the intermediate piece acts on the spring means such that same is prestressed. When a backrest lock is released, the backrest part can therefore be folded over or pivoted automatically, with the assistance of gravity and the spring action of the spring means, into a storage position.

In a storage position of the backrest part, a second stop of the intermediate piece acts on the spring means such that same is prestressed. As a result, creaking and/or rattling noises of the backrest part pivoted into the storage position are reliably avoided.

DRAWINGS

Figure 2:
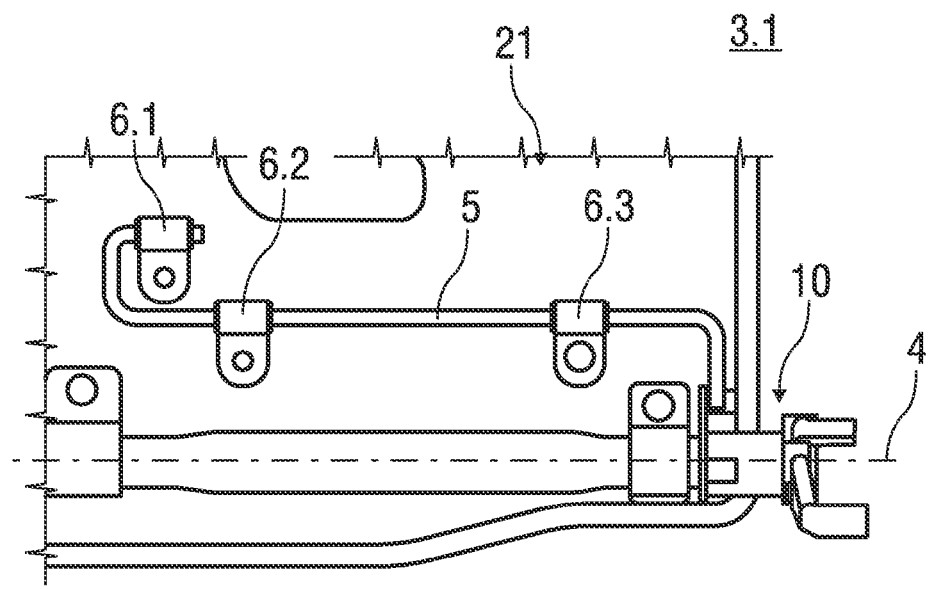
Figure 3:
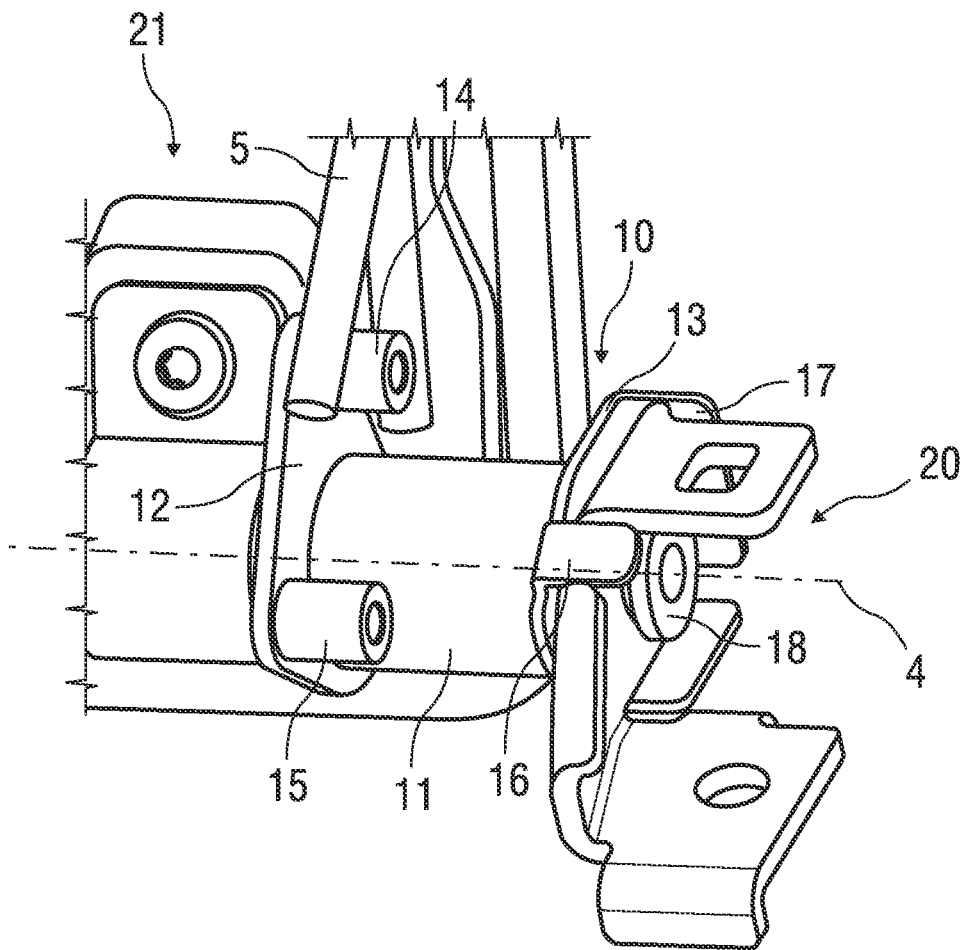

Exemplary embodiments of the invention are explained in more detail below with reference to drawings, in which:

FIG. 1 shows schematically a rear seat bench with a divided rear seat backrest in a perspective view, FIG. 2 shows schematically a detail of a backrest part as per a rear seat backrest from FIG. 1 in the region of a backrest pivot axis, and FIG. 3 shows schematically an enlarged detail of the outer bearing from FIG. 2 in a perspective view.

DETAILED DESCRIPTION

The vehicle seat 1 consists of a seat part 2 and of a first backrest part 3.1 and a second backrest part 3.2, which are pivotable individually or together relative to the seat part 2 forward in the direction of travel toward the seat part 2 in a first pivoting movement reversibly about the axis of rotation 4 from a first use position into a second storage position.

In a variant embodiment (not illustrated), each seat part 2 can be assigned a backrest part 3.1.

Furthermore, it is also conceivable, in another embodiment, to shift the backrest part 3.1 and/or 3.2 rearwards in a direction away from the seat part 2 in a second pivoting movement reversibly about the axis of rotation 4 into a third rest position.

The backrest parts 3.1 and 3.2 are formed at least from a backrest rear wall 21 and backrest upholstery (not illustrated) arranged on the latter, and a backrest cover covering the backrest upholstery.

As illustrated by way of example in FIG. 2, a spring means 5, for example the illustrated torsion spring, is fastened rotatably to the backrest rear wall 21 of the first backrest part 3.1 at a plurality of bearing points 6.1, 6.2, 6.3. In this case, the first end of the spring means 5 is held rotatably in the bearing point 6.1 and is coupled to the backrest rear wall 21 in a manner fixed relative to the frame. The second end of the spring means 5 acts in a manner still to be explained in detail against a first stop 14 which is located on a first flange 12 of an intermediate piece 10. Said intermediate piece 10 is held on a bearing 20, which is fixedly connected to the body, via the second flange 13 which is spaced apart by a connecting part 11 and is arranged substantially parallel to the first flange 12.

Those sides of the spring means 5 which face away from the backrest rear wall 21 are covered and/or surrounded by the backrest upholstery and/or the backrest cover and are therefore arranged completely within the first backrest part 3.1.

The intermediate piece 10 is at least partially arranged within the backrest part 3.1. For example, at least the first flange 12 of the intermediate piece 10 with the stops 14 and 15 arranged thereon is arranged within the backrest part 3.1 and is covered by the backrest upholstery and/or the backrest cover.

A plurality of tabs 16 and 17 are arranged on the second flange 13 of the intermediate piece 10, said tabs lying in a form-fitting manner around edges of the bearing 20 and therefore preventing a rotational movement of the intermediate piece 10 about the axis of rotation 4.

A connecting means 18 secures the intermediate piece 10 axially against the bearing 20. The connecting means 18 is designed, for example, as a conventional screw, and the connection between the bearing 20 and the intermediate piece 10 is releasable.

Before the backrest part 3.1 is fitted, the spring means 5 is stress-free and the backrest part 3.1 can simply be positioned with respect to the axis of rotation 4 and to the seat part 2. The intermediate piece 10, which is designed in the exemplary embodiment as a plug-in adapter, permits easy positioning and fitting of the bearing 20 on the vehicle body. In particular, the bearing 20 can thereby be positioned and fitted in a stress-free manner on the vehicle body. Only by the shifting of the backrest part 3.1 into the first use position is the spring means 5 pressed at the second end thereof against the first stop 14 and therefore prestressed.

If the backrest lock (not illustrated) is then released, the backrest part 3.1 moves automatically, i.e. without effort on the part of the vehicle user, driven by the prestressing of the spring means 5 and gravity for a certain subsection, from the first use position in the direction of the second storage position until the spring means 5 has relaxed.

In a further embodiment, a further stop 15 can be located on the first flange 12. If, in this case, the pivoting movement of the backrest part 3.1 about the axis of rotation 4 into the second storage position is continued, shortly before the second storage position is reached the second end of the spring means 5 comes into contact with the stop 15 and, in the process, is slightly prestressed, but this time in the opposite direction. This avoids or at least reduces possibly annoying noises, such as, for example, rattling and/or creaking due to the spring means 5 which is otherwise loose.

The use of an intermediate piece 10, preferably designed in the form of a plug-in adapter, therefore advantageously permits the arrangement of the spring means 5 within the structure of the backrest parts 3.1 and 3.2 without the backrest upholstery concerned and/or the backrest cover having to be pierced by the spring means 5.

The invention claimed is:

1. A vehicle seat comprising a seat part and at least one backrest part which is pivotable about an axis of rotation relative to the seat part, and a spring means effective between the seat part and the backrest part, wherein the backrest part comprises at least a backrest rear wall, backrest upholstery and a backrest cover, and wherein the spring means comprising a torsion spring which is arranged completely within the corresponding backrest part and is supported at a first end thereof on the backrest rear wall and acts at a second end thereof opposite the first end on an intermediate piece or on a stop of the intermediate piece, and wherein the intermediate piece is arranged on the axis of rotation of the backrest part and is rotatably coupled to a bearing that is fixed relative to a frame of the backrest part.

2. The vehicle seat as claimed in claim 1, wherein the spring means is fastened rotatably to a backrest rear wall by at least one bearing point.

3. The vehicle seat as claimed in claim 1, wherein a first end of the spring means acts on the backrest part by a first bearing point which is arranged on a backrest rear wall in a manner fixed relative to the frame of the backrest part.

4. The vehicle seat as claimed in claim 1, wherein sides of the spring means which face away from a backrest rear wall are covered and/or surrounded by the backrest upholstery and/or the backrest cover.

5. The vehicle seat as claimed in claim 1, wherein the intermediate piece is at least partially arranged within the backrest part, and wherein at least a first flange of the intermediate piece with the stop arranged thereon is arranged within the backrest part.

6. The vehicle seat as claimed in claim 5, wherein a second flange of the intermediate piece is arranged substantially parallel to the first flange and is spaced apart therefrom by a connecting part.

7. The vehicle seat as claimed in claim 1, wherein the intermediate piece is coupled to the bearing by an axially arranged connecting means.

8. The vehicle seat as claimed in claim 1, wherein, in a use position of the backrest part, a first stop acts on the spring means to prestress the spring means.

9. The vehicle seat as claimed in claim 8, wherein, in a storage position of the backrest part, a second stop acts on the spring means to prestress the spring means.

10. A vehicle seat, comprising:
a seat part;
at least one backrest part, which is pivotable about an axis of rotation relative to the seat part;
a spring means effective between the seat part and the backrest part, wherein the backrest part comprises at least a backrest rear wall, backrest upholstery, and a backrest cover, and wherein the spring means comprising a torsion spring which is arranged completely within the corresponding backrest part and is supported at a first end thereof on the backrest rear wall and acts at a second end thereof opposite the first end on an intermediate piece or on a stop of the intermediate piece, and wherein the intermediate piece is arranged on the axis of rotation of the backrest part and is fastened to a bearing in a manner fixed relative to a frame of the backrest part, and wherein the intermediate piece is at least partially arranged within the backrest part, and wherein at least a first flange of the intermediate piece with the stop arranged thereon is arranged within the backrest part, and wherein a second flange of the intermediate piece is arranged substantially parallel to the first flange and is spaced apart therefrom by a connecting part; and
a plurality of tabs arranged on the second flange of the intermediate piece, the tabs engaging in a form-fitting manner around edges of the bearing.

* * * * *